US012240255B2

(12) United States Patent
Crichton et al.

(10) Patent No.: US 12,240,255 B2
(45) Date of Patent: *Mar. 4, 2025

(54) SELECTIVELY CONFIGURABLE PRINT MODULE

(71) Applicant: Memjet Technology Limited, Dublin (IE)

(72) Inventors: Peter Crichton, North Ryde (AU); Edmund James Grohn, North Ryde (AU); Julie Hogan, Dublin (IE); Ronan Palliser, Dublin (IE)

(73) Assignee: Memjet Technology Limited, Dublin (IE)

( * ) Notice: Subject to any disclaimer, the term of this patent is extended or adjusted under 35 U.S.C. 154(b) by 236 days.

This patent is subject to a terminal disclaimer.

(21) Appl. No.: 18/062,680

(22) Filed: Dec. 7, 2022

(65) Prior Publication Data

US 2023/0173833 A1 Jun. 8, 2023

Related U.S. Application Data

(60) Provisional application No. 63/287,467, filed on Dec. 8, 2021.

(51) Int. Cl.

| | |
|---|---|
| ***B41J 25/34*** | (2006.01) |
| ***B41J 2/045*** | (2006.01) |
| ***B41J 2/165*** | (2006.01) |
| ***B41J 2/21*** | (2006.01) |
| ***B41J 25/00*** | (2006.01) |

(52) U.S. Cl.

CPC ........... *B41J 25/34* (2013.01); *B41J 2/04541* (2013.01); *B41J 2/04586* (2013.01); *B41J 2/16544* (2013.01); *B41J 2/2103* (2013.01); *B41J 25/001* (2013.01); *B41J 2202/20* (2013.01); *B41J 2202/21* (2013.01)

(58) Field of Classification Search

CPC .... B41J 25/34; B41J 2/04541; B41J 2/04586; B41J 2/16544; B41J 2/2103; B41J 25/001; B41J 2202/20; B41J 2202/21

See application file for complete search history.

(56) References Cited

U.S. PATENT DOCUMENTS 10,870,298 B2 * 12/2020 Burke ...................... B41J 29/56
12,097,716 B2 * 9/2024 Crichton ................ B41J 25/001

* cited by examiner

*Primary Examiner* — Geoffrey S Mruk
(74) *Attorney, Agent, or Firm* — Garson & Gutierrez, PC

(57) ABSTRACT

An inkjet print module includes: a printhead having first and second rows of print chips, the printhead having 180 degree rotational symmetry about a print axis parallel to a direction of droplet ejection; a fixed printhead keying feature which is rotationally asymmetric about the print axis notwithstanding the rotational symmetry of the printhead; a cradle for removably receiving the printhead, the cradle having a key assembly for complementary engagement with the fixed printhead keying feature. The key assembly is selectively configurable in either one of first and second cradle configurations so as to receive the printhead either in a first printhead orientation or a second printhead orientation, the second printhead orientation being rotated 180 degrees about the print axis relative to the first printhead orientation.

9 Claims, 10 Drawing Sheets

SELECTIVELY CONFIGURABLE PRINT MODULE

CROSS REFERENCE TO RELATED APPLICATIONS

This application claims priority to and the benefit of U.S. Provisional Patent Application No. 63/287,467, entitled ORIENTATION-AGNOSTIC PRINT MODULE AND MULTIPLE PRINT MODULE ARRAY, filed on Dec. 8, 2021, the disclosure of which is incorporated herein by reference in its entirety for all purposes.

FIELD OF THE INVENTION

This invention relates to print modules adapted for a multiple module array. It has been developed primarily to enable high-quality, single pass printing using multiple inkjet print modules, whilst allowing interchanging of printheads between modules.

BACKGROUND OF THE INVENTION

Inkjet printers employing Memjet® technology are commercially available for a number of different printing formats, including desktop printers, digital inkjet presses and wideformat printers. Memjet® printers typically comprise one or more stationary inkjet printheads, which are user-replaceable. For example, a desktop label printer comprises a single user-replaceable full color printhead and a wideformat printer comprises a plurality of user-replaceable printheads in a staggered overlapping arrangement so as to span across a wideformat media path.

U.S. Pat. No. 10,076,917, the contents of which are incorporated herein by reference, describes a commercial pagewide printing system comprising an N×M two-dimensional array of monochrome print modules and corresponding maintenance modules. Providing OEM customers with the flexibility to select the dimensions and number of printheads in an N×M modular array enables access to a wider range of commercial digital printing markets that are traditionally served by offset printing systems. Nevertheless, integration of print modules and maintenance modules into an inkjet press still requires some development work from OEMs.

U.S. Pat. No. 11,014,366, the contents of which are incorporated herein by reference, describes a print module comprising a full-color printhead having double redundancy in each color to provide excellent print quality. The print module has a fully integrated capper and wiping system for printhead maintenance and can be readily installed as a low-cost, full color print engine for a number of printing applications (e.g. direct mail, flexible packing, corrugated etc.)

In order to expand the markets available for integrated inkjet print modules, such as those described in U.S. Pat. No. 11,014,366, it is desirable to position such modules over a media path in an overlapping arrangement so as to increase the width of a printable region. Stitching overlapping printheads requires precise alignment of the printheads and it is desirable to place the printheads as closely together as possible in order to minimize the effects of any misalignments. The requirement to place overlapping printheads as closely together as possible typically necessitates different mechanical designs of 'forwards' and 'backwards' print modules, as described in U.S. Pat. No. 9,061,531, the contents of which are incorporated herein by reference.

Nevertheless, it would be desirable to provide print modules that can be positioned in either a backwards or forwards orientation with minimal adaptations of the print module.

Furthermore, it is desirable to allow users to swap printheads between print modules, regardless of the position or orientation of the print module in a pagewide array.

SUMMARY OF THE INVENTION

In a first aspect, there is provided an inkjet print module comprising:

- a printhead comprising first and second rows of print chips, said printhead having 180 degree rotational symmetry about a print axis parallel to a direction of droplet ejection;
- a cradle for removably receiving the printhead; and
- control circuitry for distributing data signals to the printhead via first and
- second data paths of the inkjet print module, wherein:
- the cradle is configurable for receiving the printhead in first and second printhead orientations relative to the print module, the second printhead orientation being rotated 180 degrees about the print axis relative to the first printhead orientation; and
- the control circuitry is configurable to invert distribution of the data signals between the first and second data paths.

The print module according to the first aspect advantageously enables print modules to be arranged across a media path with alternate ("forwards" and "backwards") orientations whilst also enabling printheads to be swapped between print modules, when required. The print modules are effectively agnostic with respect to their orientation insofar as those print modules in a 'backwards' orientation require minimal adaptation for use with the same printheads as those print modules in a 'forwards' orientation. Effectively, inverting the control circuitry (e.g. via a user-actuated switch) and a re-ordering of ink connections to the print module is all that is required to enable print modules to be reversed in the array. Thus, the same print module is usable in either orientation and, as will be explained in more detail below, printheads may be swapped between forwards and backwards-facing modules without risk of mixing ink colors.

Preferably, first and second rows of print chips have 180 degree rotational symmetry about the print axis.

Preferably, the cradle comprises configurable key slot assembly for complementary engagement with a fixed printhead keying feature, and wherein the key slot assembly configures the cradle to receive the printhead in either the first printhead orientation only or the second printhead orientation only.

Preferably, the fixed printhead keying feature is rotationally asymmetric about the print axis notwithstanding the rotational symmetry of the printhead.

Preferably, the printhead comprises a plurality of printhead ink ports at opposites ends thereof and the inkjet print module comprises complementary ink couplings for detachable connection to the printhead ink ports.

Preferably, the inkjet print module further comprises a plurality of module ink ports for connection to a corresponding plurality of ink reservoirs supplying ink to the ink couplings, each module ink port being connectable to any one of the plurality of ink reservoirs such that an order of inks supplied to the printhead ink ports is reversible.

Preferably, the inkjet print module further comprises a switch (e.g. toggle switch) operatively connected to the control circuitry for inverting distribution of the data signals.

Preferably, the control circuitry comprises a controller chip configured for receiving the print data and distributing the data signals between the first and second data paths.

Preferably, the first and second data paths comprise respective first and second module contacts, each of the first and second module contacts being configured for electrical connection to either first or second printhead contacts in either the first or second printhead orientations.

Preferably, the printhead is asymmetrically positioned towards one side of the inkjet print module.

Preferably, the inkjet print module further comprises one or more of:

a printhead capper;

a printhead wiping system;

a lift mechanism for lifting and lowering the printhead relative to a media path.

In a second aspect, there is provided a printing system comprising a plurality of inkjet print modules as described above, the plurality of inkjet print modules comprising:

a first inkjet print module positioned over a media path in a first module orientation with respect to the media path, the first print module comprising a respective printhead received in a respective cradle in the first printhead orientation relative to the first print module, such that the first row of print chips of the first print module is upstream of the second row of print chips; and a second inkjet print module positioned over the media path in a second module orientation rotated 180 degrees relative to the first module orientation, the second print module comprising a respective printhead received in a respective cradle in the second printhead orientation relative to the second print module, such that the first row of print chips of the second print module is downstream of the second row of print chips wherein:

data signals corresponding to a first color plane are distributed only via the first data path of the first print module; and data signals corresponding to said first color plane are distributed only via the second data path of the first print module.

In one embodiment, the first and second print modules are positioned across the media feed path in a staggered overlapping arrangement such that the first and second printheads overlap. However, the print modules may be positioned in alternative arrangements, as required.

Preferably each printhead is supplied with ink such that an ink ordering in the first and second rows of print chips relative to the media path is identical in both the first and second inkjet print modules.

Preferably, each row of print chips is configurable for printing two colors of ink.

Preferably, a printhead contaminated with ink and removed from either the first or second inkjet print module is replaceable in either the first or second inkjet print module.

Preferably, a first switch operatively connected to control circuitry of the first inkjet print module is deactuated and a second switch operatively connected to control circuitry of the second inkjet print module is actuated, such that said second switch inverts data signals distributed via the first and second data paths of second inkjet print module relative to the first inkjet print module.

In a third aspect, there is provided inkjet print module comprising:

a printhead comprising first and second rows of print chips, said printhead having 180 degree rotational symmetry about a print axis parallel to a direction of droplet ejection;

a fixed printhead keying feature extending from the printhead, said printhead keying feature being rotationally asymmetric about the print axis notwithstanding the rotational symmetry of the printhead;

a cradle for removably receiving the printhead, said cradle comprising a key assembly for complementary engagement with the fixed printhead keying feature, the key assembly being selectively configurable in either one of first and second cradle configurations, wherein:

the cradle receives the printhead only in a first printhead orientation in the first cradle configuration; and the cradle receives the printhead only in a second printhead orientation in the second cradle configuration, the second printhead orientation being rotated 180 degrees about the print axis relative to the first printhead orientation.

Preferably, the key assembly has a pair of slots defined in part of the cradle and a shutter for selectively obscuring either one of the slots.

Preferably, the shutter is slidably movable between the pair of slots.

Preferably, the cradle comprises a printhead carrier for longitudinally slidably receiving the printhead, the printhead carrier including the key assembly.

Preferably, the key assembly is positioned at a first end of the printhead carrier, the printhead carrier receiving the printhead at said first end.

Preferably, the printhead carrier pivotable about a second end opposite the first end thereof.

Preferably, the printhead comprises a plurality of printhead ink ports at opposites ends thereof and the inkjet print module comprises complementary ink couplings for detachable connection to the printhead ink ports.

Preferably, the inkjet print module further comprises a plurality of module ink ports for connection to a corresponding plurality of ink reservoirs supplying ink to the ink couplings, each module ink port being connectable to any one of the plurality of ink reservoirs such that an order of inks supplied to the printhead ink ports is reversible.

In a fourth aspect, there is provided a printing system comprising a plurality of inkjet print modules as described above, the plurality of inkjet print modules comprising:

a first inkjet print module positioned over a media path in a first module orientation with respect to the media path, the first print module comprising a respective printhead received in a respective cradle in the first printhead orientation relative to the first print module, such that the first row of print chips of the first print module is upstream of the second row of print chips; and a second inkjet print module positioned over the media path in a second module orientation rotated 180 degrees relative to the first module orientation, the second print module comprising a respective printhead received in a respective cradle in the second printhead orientation relative to the second print module, such that the first row of print chips of the second print module is downstream of the second row of print chips wherein:

the key assembly of the first inkjet print module is configured for complementary engagement with the fixed printhead keying feature of its respective printhead only in the first printhead orientation; and the key assembly of the second inkjet print module is configured for complementary engagement with the fixed printhead keying feature of its respective printhead only in the second printhead orientation.

Preferably, the first and second inkjet print modules are positioned across the media feed path in a staggered overlapping arrangement such that the first and second printheads overlap.

Preferably, each printhead is supplied with ink such that an ink ordering in the first and second rows of print chips relative to the media path is identical in both the first and second inkjet print modules.

Preferably, each row of print chips is configurable for printing two colors of ink.

In a fifth aspect, there is provided a method of configuring an orientation-agnostic inkjet print module for use in either one of first or second module orientations relative to a media path, the second module orientation being rotated 180 degrees relative to the first module orientation, said method comprising the steps of:

- configuring a key assembly to correspond with either one of the first or second module orientations, said key assembly determining a printhead orientation of a respective printhead relative to the inkjet print module; and
- configuring a switch to correspond with either one of the first or second module orientations, said switch being operably connected to controller circuitry distributing data signals to the printhead via first and second data paths, and said switch inverting distribution of the data signals between the first and second data paths.

Preferably, the key assembly has a pair of slots defined in part of the cradle and a shutter for selectively obscuring either one of the slots.

Preferably, configuring the key assembly comprises the step of sliding the shutter so as to selectively obscure either one of the slots.

Preferably, the method comprises the step of positioning first and second inkjet print modules across a media feed path, wherein the first inkjet print module is positioned and configured in the first module orientation and the second inkjet print module is positioned and configured in the second module orientation.

Preferably, the printhead is asymmetrically positioned towards one side of the inkjet print module, such that respective printheads of the first and second inkjet print modules are proximal relative to the media path.

Preferably, the method further comprises the step of connecting respective ink reservoirs to module ink ports of the first and second inkjet print modules, wherein an order of ink connections is reversed in the second inkjet print module relative to the first inkjet print module.

As used herein, "printhead having 180 degree rotational symmetry" is taken to mean that the printhead generally has 180 degree rotational symmetry in respect of functional mechanical features, such as print chips, ink ports, datums, printhead contacts, ink manifold, printhead housing, datums etc. However, it will be appreciated that the 180 degree rotational symmetry of the printhead does not include any asymmetric keying feature(s) specifically provided to control an orientation of printhead insertion into the cradle. Neither, of course, does the 180 degree rotational symmetry necessarily include any non-functional features, such as labels, surface patterning or ornamentation etc. Furthermore, for the avoidance of doubt, the 180 degree rotational symmetry of the printhead relates only to mechanical printhead features and does not include, for example, any ink contained in the printhead.

As used herein, the term "ink" is taken to mean any printing fluid, which may be printed from an inkjet printhead. The ink may or may not contain a colorant. Accordingly, the term "ink" may include conventional dye-based or pigment based inks, infrared inks, fixatives (e.g. pre-coats and finishers), 3D printing fluids (e.g. binder fluids), functional fluids (e.g. solar inks, sensing inks etc.), biological fluids and the like.

As used herein, the term "mounted" includes both direct mounting and indirect mounting via an intervening part.

BRIEF DESCRIPTION OF THE DRAWINGS

Embodiments of the present invention will now be described by way of example only with reference to the accompanying drawings, in which.

DETAILED DESCRIPTION OF THE INVENTION

Inkjet Print Module

Figure 1:
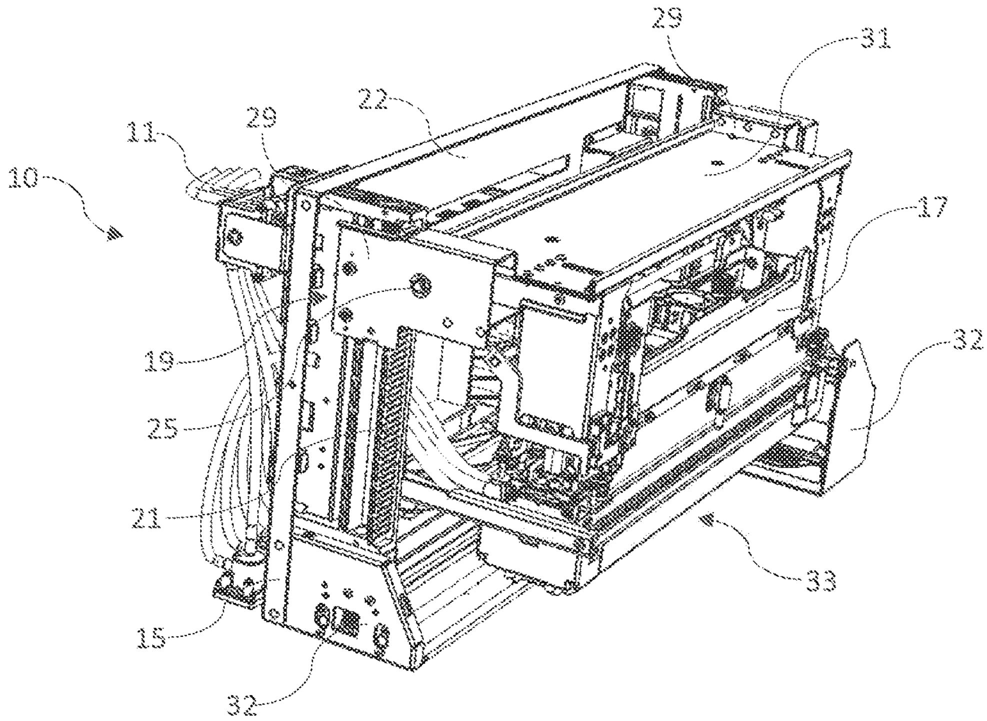
FIG. 1 is a side perspective of an inkjet print module.
Figure 2:
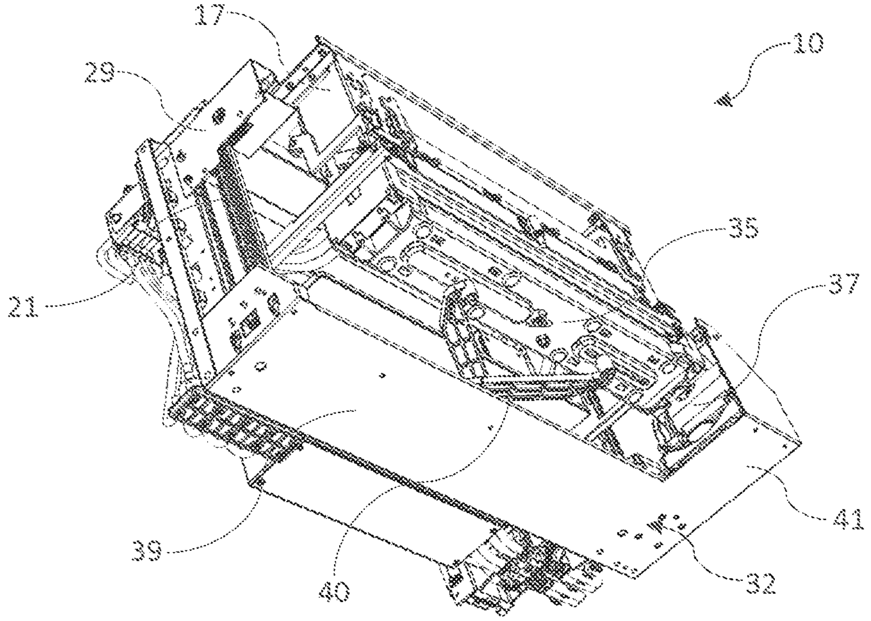
FIG. 2 is a bottom perspective of the inkjet print module.
Figure 3:
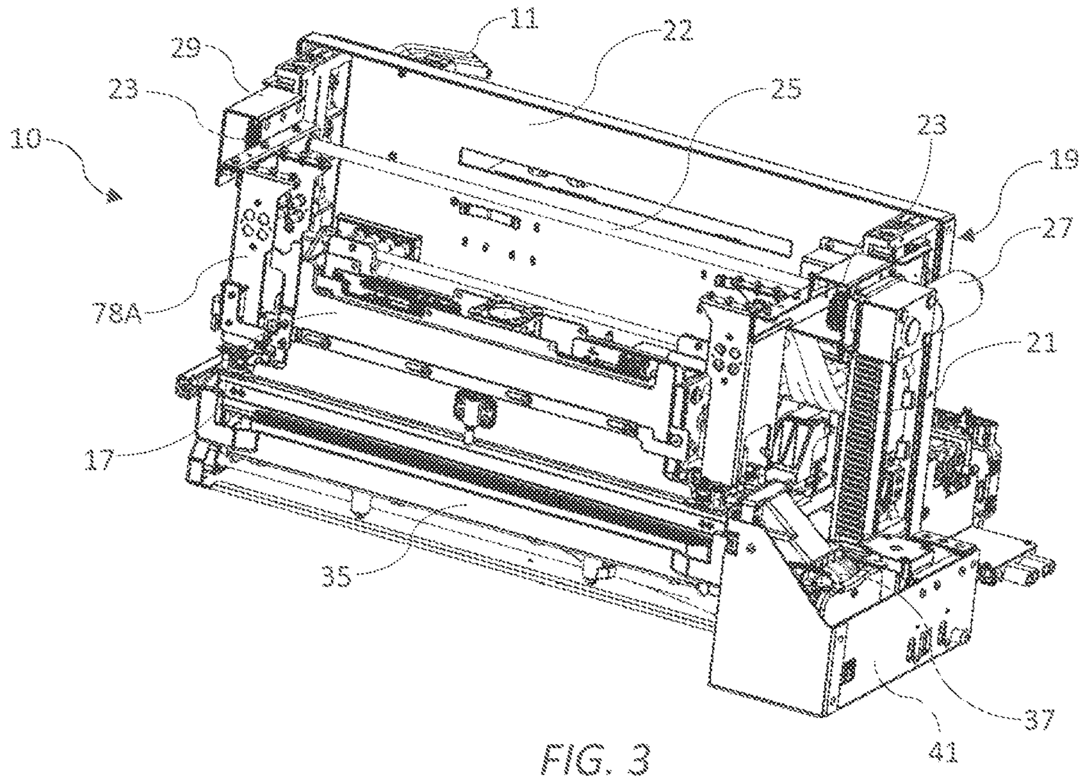
FIG. 3 is a front perspective of the inkjet print module.

Referring to FIGS. 1 to 3, there is shown an inkjet print module 10 (or "print engine"), as described in U.S. Pat. No. 11,014,366, the contents of which are incorporated herein by reference. The inkjet print module 10 is designed as a fully integrated 'drop-in' module incorporating printhead mounting structures, ink delivery systems, maintenance systems, printhead lift mechanism etc., which allow the inkjet print module to be installed in end-user printing systems with minimal development work from OEMs.

As shown in FIG. 1, the inkjet print module 10 comprises a chassis 15 for fixedly mounting in a printing system and a printhead support module 17 movably connected to the chassis 15 via a module lift mechanism 19. The inkjet print module 10 typically incorporates an integrated ink delivery system with module ink ports 11 providing connections to external ink reservoirs (not shown). The integrated ink delivery system may, for example, include a pressure-regulating tank, pump, pinch valve and circulating fluidic loop for each color channel, as described in U.S. Pat. No. 10,639,903, the contents of which are included herein by reference.

The inkjet print module 10 is shown with the printhead support module 17 in its raised (maintenance) position in FIGS. 1 to 3. The module lift mechanism 19 takes the form of a rack-and-pinion mechanism comprising a pair of racks 21 mounted to opposite ends of a backplate 22 of the chassis 15 and a corresponding pair of pinions 23 engaged with the racks, the pair of pinions being fixedly mounted about an interconnecting pinion shaft 25. The module lift mechanism 19 is driven by a lift motor 27 operatively connected to one of the pinions 23 for moving the pair of pinions along the racks via rotation of the interconnecting pinion shaft 25.

The pinion shaft 25 is rotatably mounted between a pair of lift brackets 29 housing respective pinions 23, such that the lift brackets may be lowered or raised by the module lift mechanism 19. The lift brackets 29 are interconnected via an elongate mounting beam 31 extending longitudinally along a length of the print engine 10. An upper portion of the printhead support module 17 has suitable mounting fixtures 30 for fixed attachment to the mounting beam 31 (see FIG. 5). Hence, the printhead support module 17 may be raised and lowered via actuation of the lift motor 27 between a maintenance position and a printing position, respectively.

Figure 4:
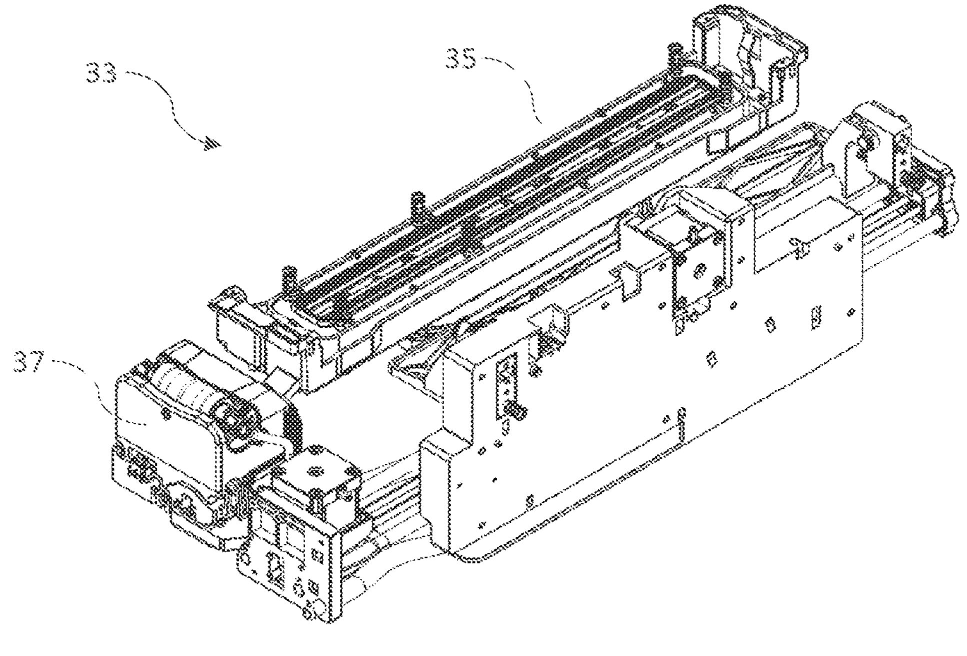
FIG. 4 shows a maintenance sub-assembly of the inkjet print module.

A lower portion of the chassis 15 comprises an L-shaped frame 32 fixed to the backplate 22. The L-shaped frame 32 houses a maintenance sub-assembly 33 of the inkjet print module 10 and is shown in isolation in FIG. 4. The maintenance sub-assembly 33 comprises a capper 35 and a wiper carriage 37 for performing maintenance operations on an elongate inkjet printhead 50 received in the printhead support module 17. The capper 35, which is housed in a longer arm 39 of the L-shaped frame, is laterally extendible from the backplate 22 of the chassis 15 via a scissor mechanism 40 for capping the printhead 50. The wiper carriage 37, which is housed in a shorter arm 41 of the L-shaped frame, is traversable along a longitudinal axis of the printhead support module 17 for wiping the printhead 50. In the configuration shown in FIGS. 1 to 4, the capper 35 is in its laterally extended position with the printhead capped, and the wiper carriage 37 is in its parked or 'home' position housed within the shorter arm 41 of the L-shaped frame 32. The maintenance sub-assembly 33 is similar in both function and mechanism to the maintenance module described in U.S. Pat. No. 10,081,204, the contents of which are incorporated herein by reference. Accordingly, for a more detailed description of the function and mechanism of the maintenance sub-assembly 33, the skilled person is referred to U.S. Pat. No. 10,081,204.

Figure 5:
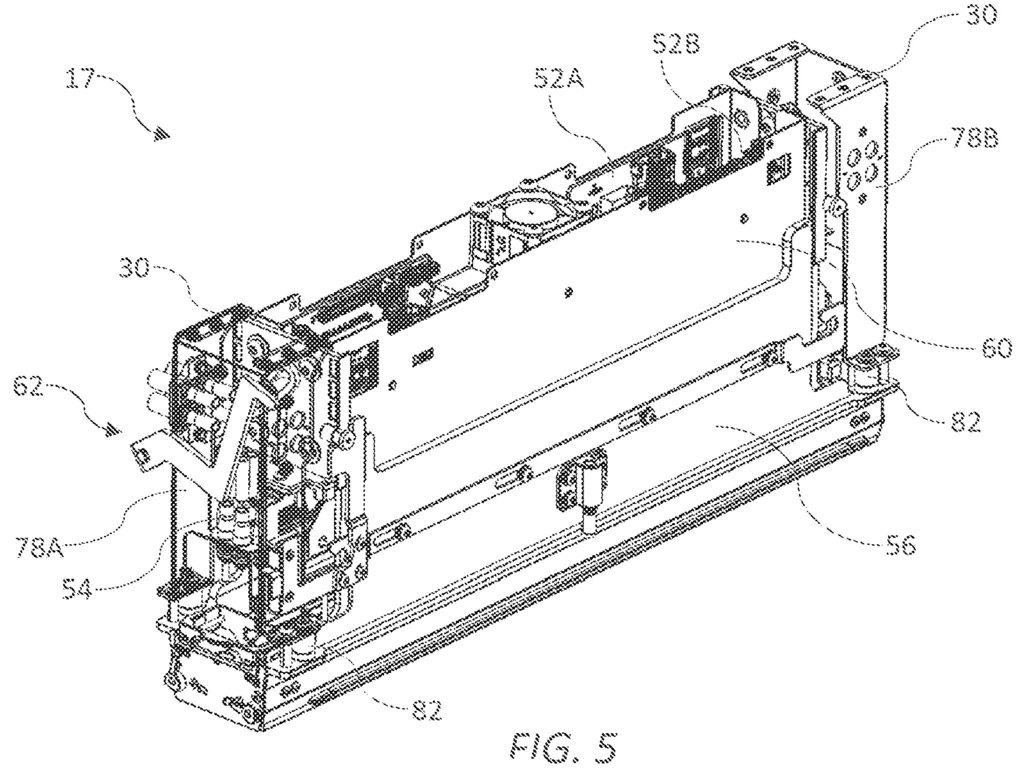
FIG. 5 is a front perspective view of a printhead support module.
Figure 6:
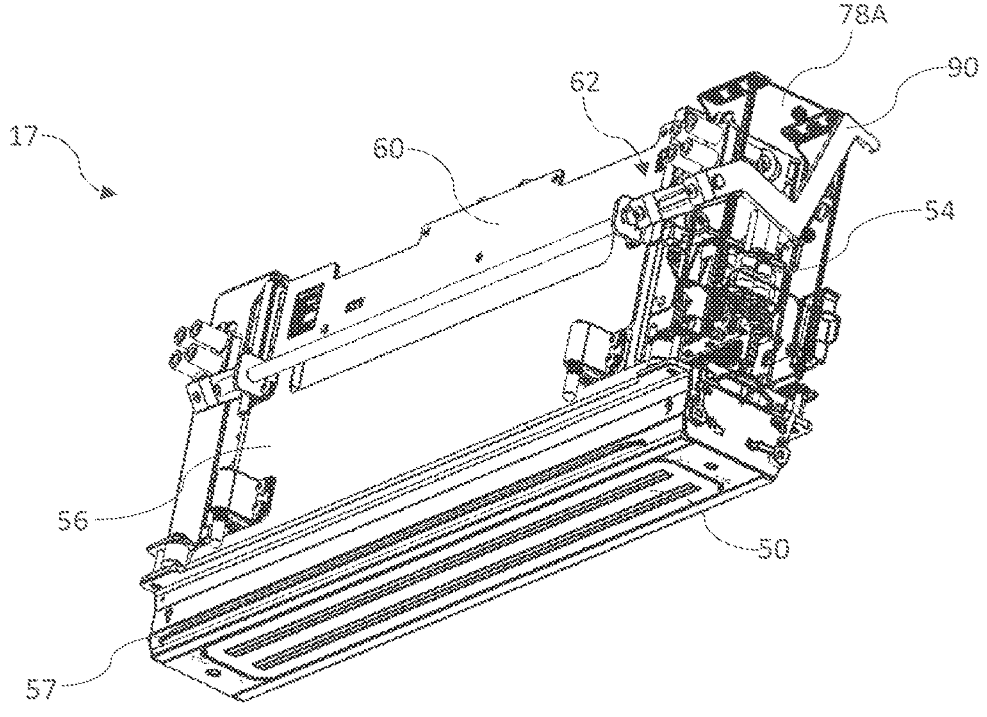
FIG. 6 is a rear perspective of the printhead support module.
Figure 7:
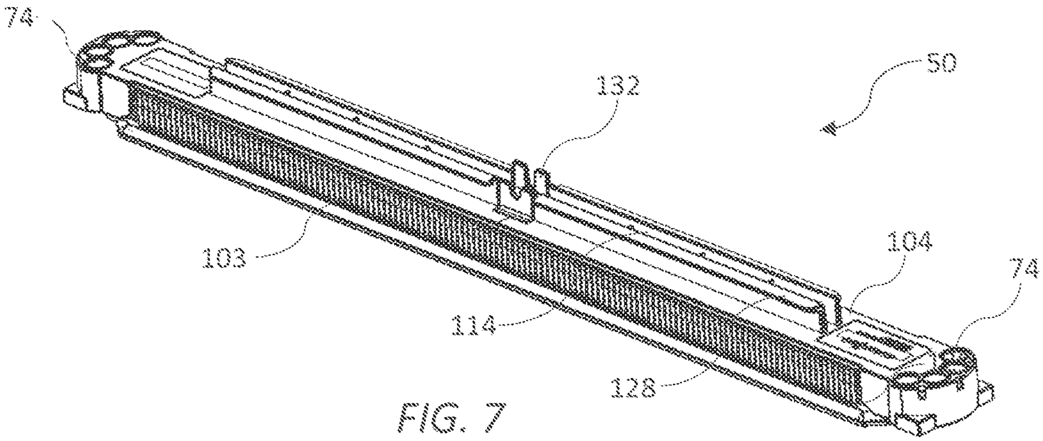
FIG. 7 is a top perspective of an inkjet printhead.
Figure 8:
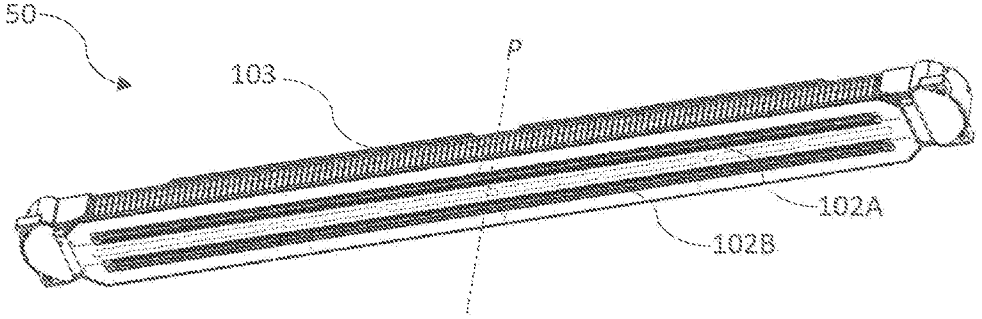
FIG. 8 is a bottom perspective of the inkjet printhead.

Referring to FIGS. 5 and 6, the printhead support module 17 is shown in isolation. The printhead support module 17 is generally elongate and serves the primary function of detachably mounting the printhead cartridge 50 (or "printhead 50") shown in FIGS. 7 and 8, which is described in detail in U.S. Pat. No. 10,293,609, the contents of which are incorporated herein by reference. Briefly, the printhead 50 comprises a first row of print chips 102A and a second row of print chips 102B, with each row containing a plurality of print chips butted together end-on-end in a line. The print chips are mounted on a lower surface of an ink manifold (not visible in FIGS. 7 and 8), which is contained in a two-part housing 104. Ink ports 74 at opposite ends of the housing serve as inlet or outlet ports of the printhead 50, delivering ink to longitudinal ink channels (not shown) and enabling ink circulation through printhead. A plurality of printhead contacts 103 extend along opposites sides of the printhead 50 for electrical connection to complementary PCB contacts 101 of the printhead support module 17. An overhead hanger 114 is configured for complementary sliding engagement with a printhead carrier 112 of the printhead support module 17. Notwithstanding an asymmetric key projection 132 extending from an upper part of the printhead 50, the printhead has 180 degree rotational symmetry about a centrally-positioned print axis P parallel with an axis of droplet ejection. As a consequence of this symmetry, the printhead 50 is, in principle, usable in either a first orientation or a second orientation rotated 180 degrees about the print axis P relative to the first orientation.

Returning to FIG. 5, the printhead support module 17 houses first and second opposed PCBs 52A and 52B and a pair of ink couplings 54, as well as various mechanisms for detachably connecting PCB contacts 101 and the ink couplings to the printhead 50. In particular, the printhead support module 17 comprises a cradle 56 and a movable supply assembly 60.

Figure 9:
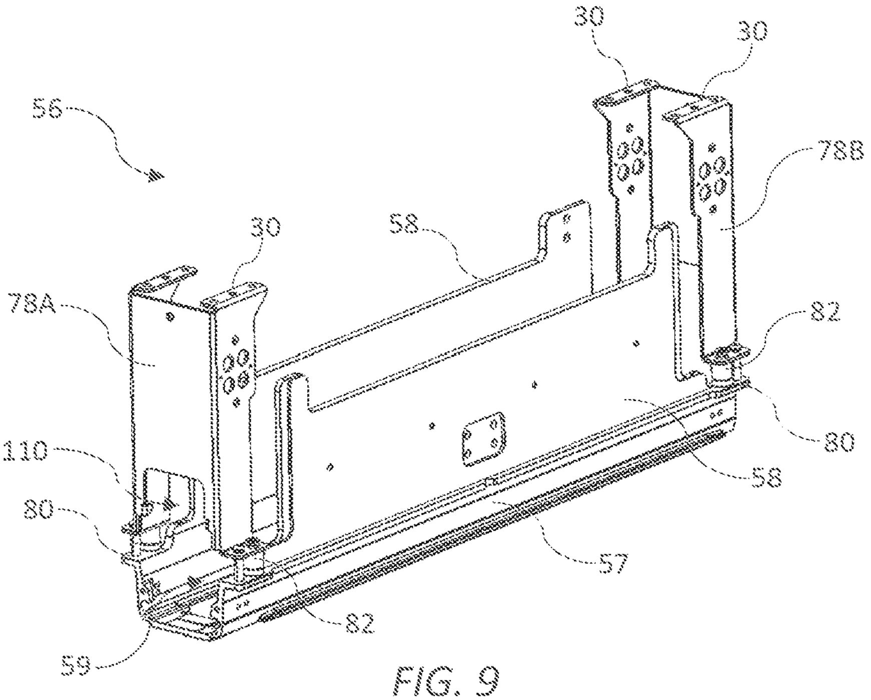
FIG. 9 is a perspective of a cradle for the inkjet print module.

Referring to FIG. 9, the cradle 56 comprises a lower nest 57 defining a longitudinal cavity 59 for receiving the printhead 50; front and rear cradle side plates 58 extending upwardly from the nest; and first and second end housings 78A and 78B fastened to the nest. Each of the first and second end housings 78A and 78B has a foot portion connected to anchor points 80 of the nest 57 and an upper portion including the mounting fixtures 30 for attachment to the mounting beam 31 of the inkjet print module 10. A resilient fastening arrangement 82 is used to attach the end housings 78A and 78B to the anchor points 80 in order to provide a degree of tolerance for the module lift mechanism 19 when datuming the printhead supply module 17 into its printing and maintenance positions.

The supply assembly 60 is slidably received in the cradle 56 between the front and rear cradle side plates 58, the supply assembly being liftable towards and away from the nest 57 (containing the printhead 50) by means of, for example, a lever mechanism 62 actuated via a lever handle 90, as described in U.S. Pat. No. 11,014,366.

Figure 10:
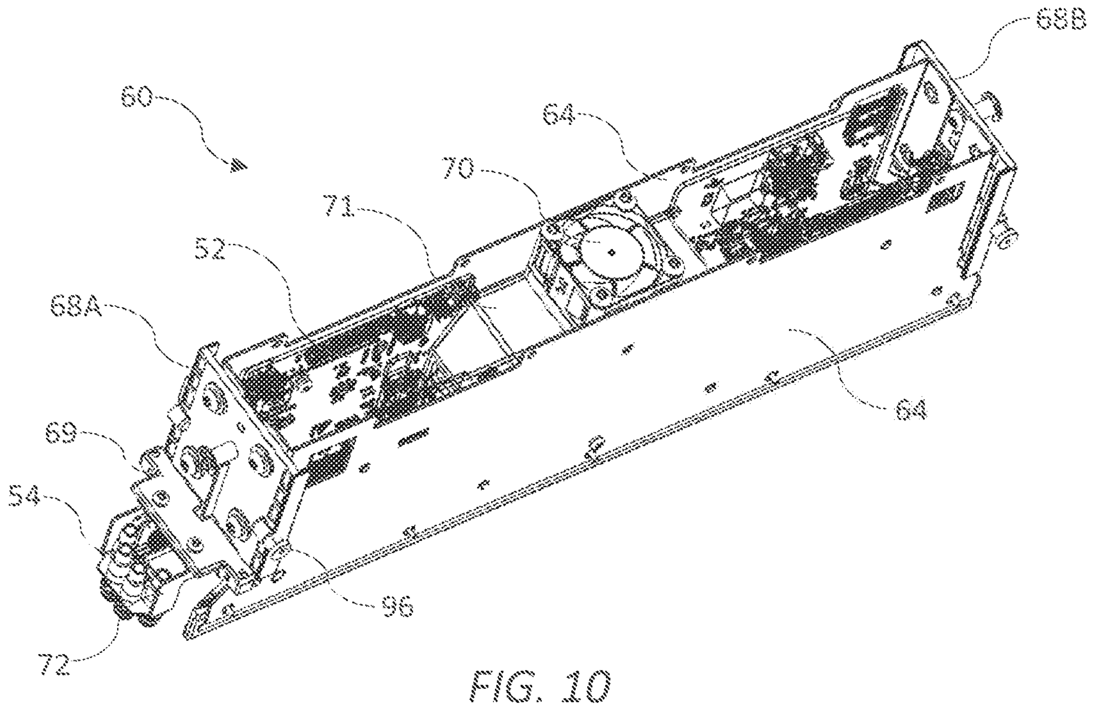
FIG. 10 is a top perspective of a supply assembly for the inkjet print module.
Figure 11:
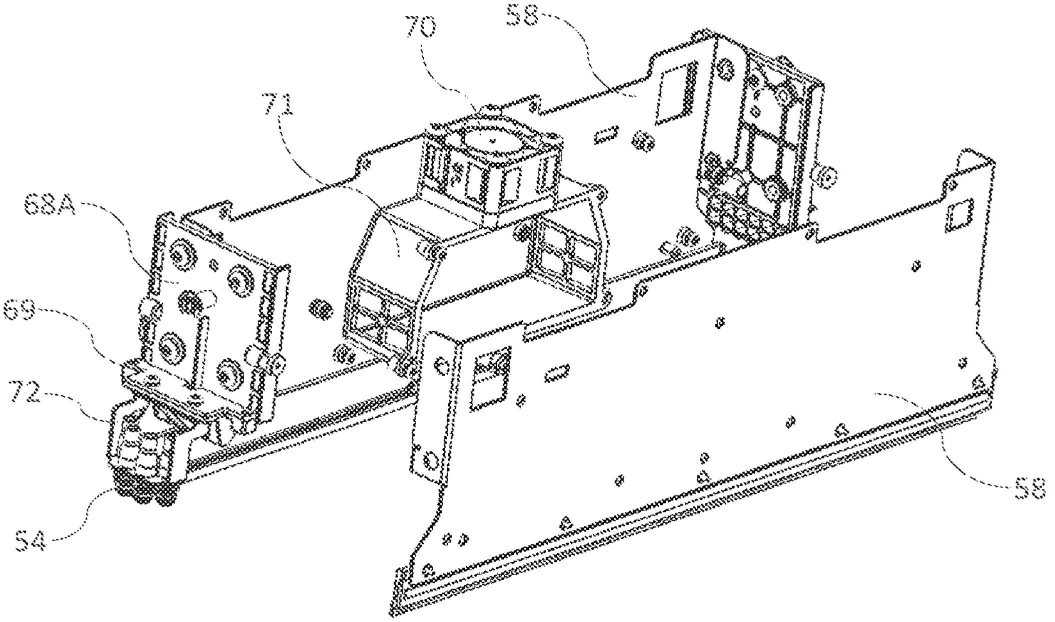
FIG. 11 is an exploded perspective of the supply assembly shown in FIG. 10 with PCBs removed.
Figure 12:
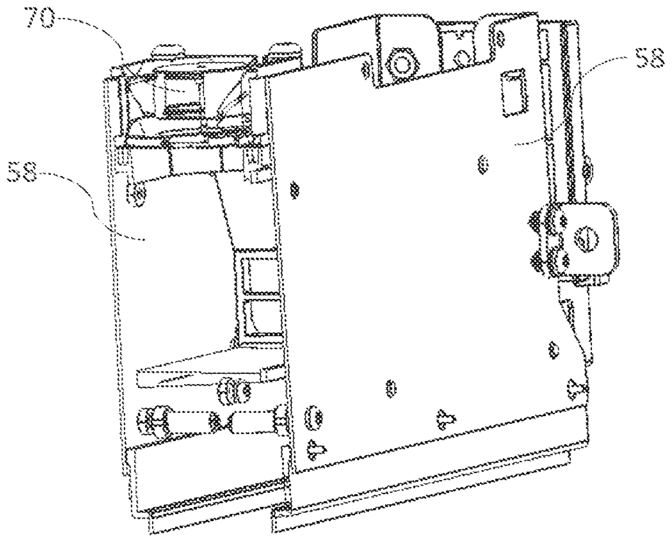
FIG. 12 is a sectional perspective of the supply assembly shown in FIG. 10 with PCBs removed.
Figure 13:
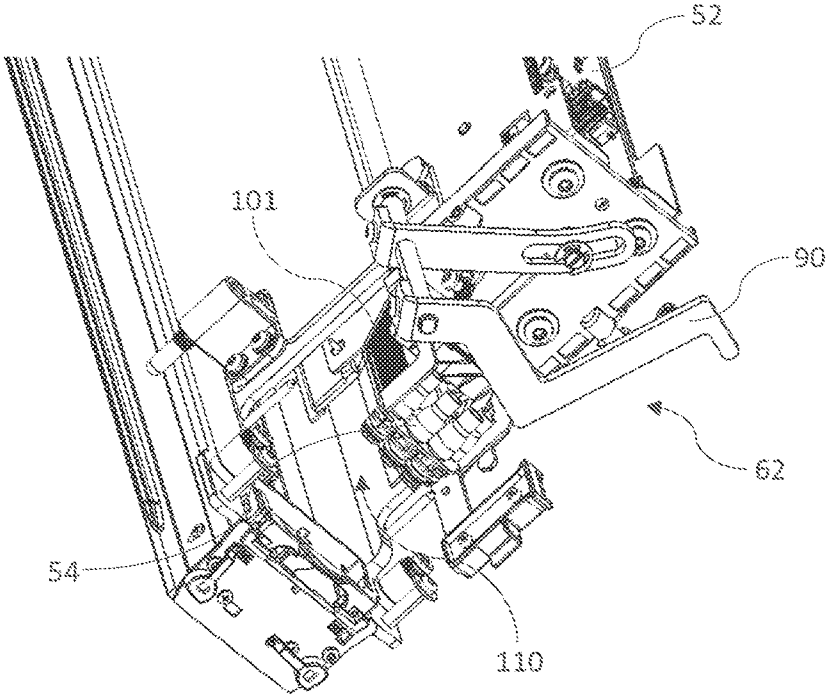
FIG. 13 shows an access opening at a first end of the inkjet print module.

Referring to FIGS. 10 to 13, the supply assembly 60 comprises a pair of front and rear PCB mounting plates 64 extending parallel with the cradle side plates 58. As shown in FIG. 10, the opposed PCBs 52 are each fastened to a respective PCB mounting plate 64 with a space defined between the opposed PCBs. Each PCB 52 has respective PCB contacts 101 (not visible in FIG. 10) positioned at a lower part thereof for forming electrical connections with respective printhead contacts 103 at opposite sides of the printhead 50.

A fan assembly braced between the two PCB mounting plates 64 comprises a fan 70 and ducting arrangement 71 to provide airflow into the space between the PCBs 52 for cooling various electronic components. Structural rigidity is provided by first and second end brackets 68A and 68B interconnecting the front and rear PCB mounting plates 64.

Each of the first and second end brackets 68A and 68B has a mounting bracket 69 extending longitudinally outwardly therefrom for mounting a set of ink couplings 54 via a respective ink coupling bracket 72 hanging from the mounting bracket. Hence, the ink couplings 54 are fast with the supply assembly 60 and move in concert with the PCBs 52.

There are two sets of ink couplings 54 at opposite ends of the supply assembly 60 corresponding to ink ports 74 at opposite ends of the printhead 50.

The two sets of ink couplings 54, ink coupling brackets 72 and mounting shelves 69 positioned at opposite ends of the first print module 17 are contained in respective first and second end housings 78A and 78B of the cradle 56. The first end housing 78A at the first end of the first print module 17 is transparent in FIGS. 5 and 6 to reveal the ink couplings 54 and associated mountings.

As described in U.S. Pat. No. 11,014,366, ink connections to the printhead 50 are made by lowering the supply assembly 60 along a nominal z-axis using the lever mechanism 62. With the supply assembly 60 in its lowered position, the opposed rows of PCB contacts 101 are positioned adjacent respective printhead contacts 103. Ink connections and electrical connections between the supply assembly 60 and the printhead 50 are formed in separate steps, thereby minimizing the forces required for forming such connections.

The first end housing 78A at the first end of the first print module 17 defines an access opening 110 for longitudinal insertion and removal of the printhead 50 along a nominal y-axis. The cradle 56 comprises a printhead carrier 112, which is pivotable about a cradle pivot axis 116 transverse to the print axis P and the longitudinal axis of the printhead. For printhead insertion/removal, the printhead carrier 112 is pivoted such that one end thereof proximate the access opening 110 is lifted into a printhead access position.

Figure 14A:
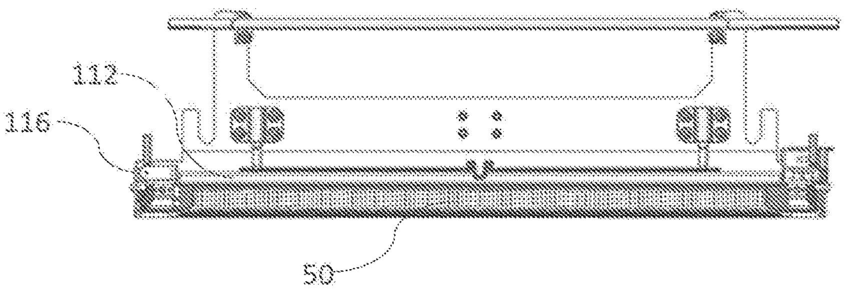
FIGS. 14A-C are schematic side views showing removal of a printhead from a pivoting printhead carrier.
Figure 14B:
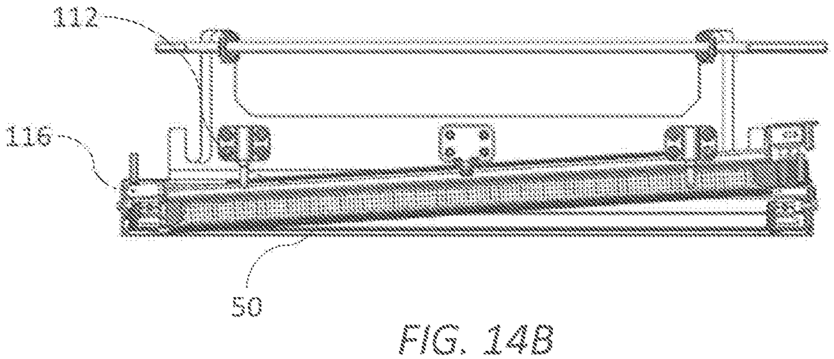
Figure 14C:
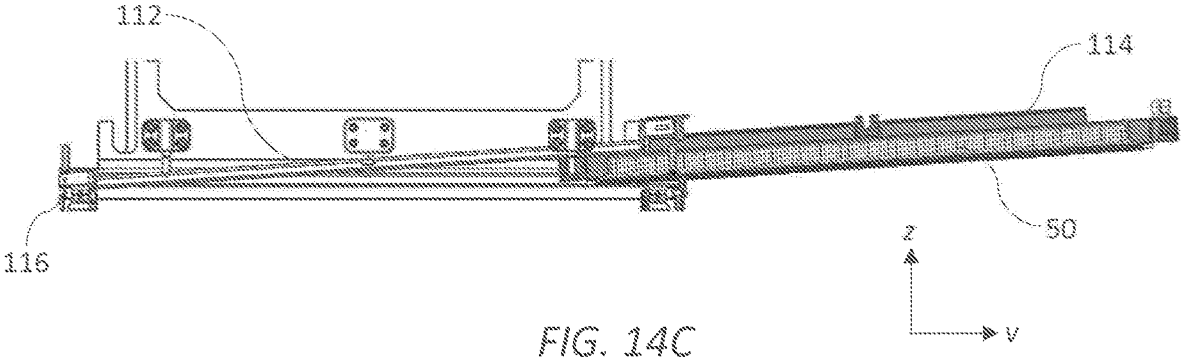
Figure 15:
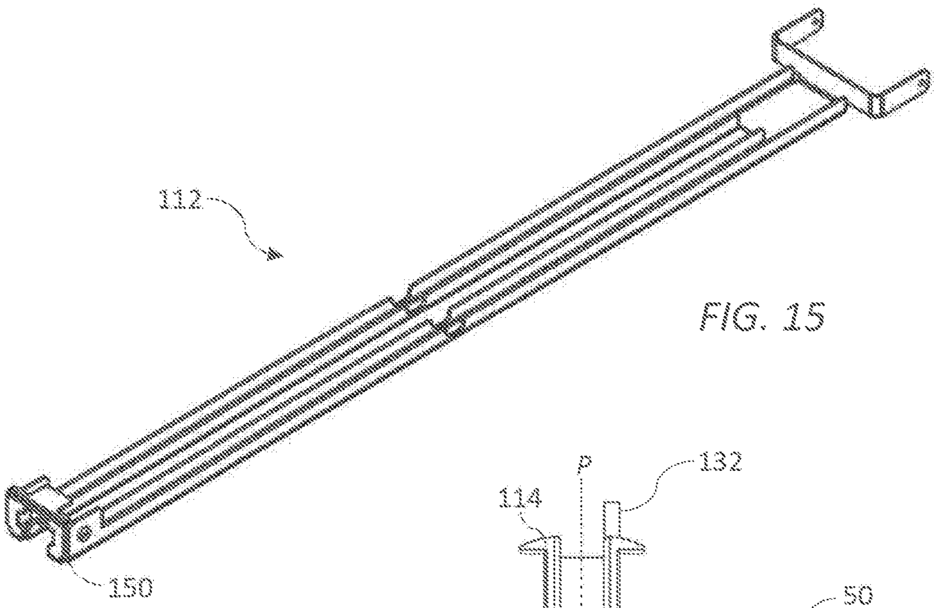
FIG. 15 is a perspective of a printhead carrier.
Figure 16:
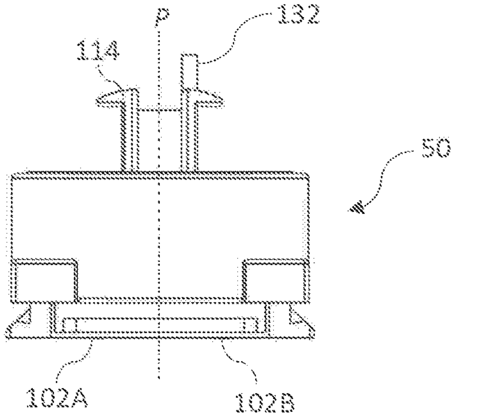
FIG. 16 is an end view of the inkjet printhead shown in FIGS. 7 and 8.

FIGS. 14A-C show the basic pivoting motion of the printhead carrier 112 for removal of the printhead 50. In FIG. 14A, the printhead is fully engaged with the printhead carrier and seated horizontally in the nest 57 in a printing configuration. In FIG. 14B, the printhead 50 is still fully engaged with the printhead carrier 112, but the printhead carrier has been pivoted about the pivot axis 116 at the second end of the nest 57, such that the first end of the printhead carrier 112 (and printhead 50) is raised relative to the second end. In FIG. 14C, the printhead 50 is being longitudinally slidably removed from the printhead carrier 112 by means of pulling the printhead away from the printhead carrier.

As described in U.S. Pat. No. 11,014,366, for a single inkjet print module 10 ("print engine") the key projection 132 of the printhead 50 and a complementary key slot of the printhead carrier 112 together ensure that the printhead can only be slidably inserted into the printhead carrier 112 in one predetermined orientation. However, as will be described below, for modular arrangements using a plurality of inkjet print modules 10 in 'forwards' and 'backwards' orientations, the printhead carrier 112 comprises a configurable key slot assembly 150 to allow slidable insertion of the printhead into the printhead carrier in either one of first and second printhead orientations, thereby making use of the inherent rotational symmetry of the printhead.

Cradle and Printhead Keying Arrangement

Referring to FIGS. 15, 16 and 17A-C, there is shown a cradle and printhead keying arrangement, which is configurable for receiving the printhead 50 in the first printhead orientation only or the second printhead orientation only, by virtue of complementary engagement between the fixed printhead keying feature 132 and the configurable key slot assembly 150.

The key slot assembly 150 comprises first and second key slots 152A and 152B defined at a first end of the printhead carrier 112 together with a slidably movable shutter 154 for selectively obscuring one of the key slots. In a first cradle configuration shown in FIG. 17A, the shutter 154 obscures the first key slot 152A (but not the second key slot 152B) such that the printhead 50 can only be inserted longitudinally into the printhead carrier 112 in the first printhead orientation shown in FIG. 16. In a second cradle configuration shown in FIG. 17B, the shutter 154 has been slidably moved across to obscure the second key slot 152B with the first key slot 152A now open. In this second cradle configuration, the printhead carrier 112 cannot receive the printhead 50 in the first printhead orientation. In order to insert the printhead 50 into the printhead carrier 112 in this second cradle configuration, the printhead must be rotated by 180 degrees about the print axis P into a second printhead orientation so that the key projection 132 is presented to the open first key slot 152A.

Figure 17A:
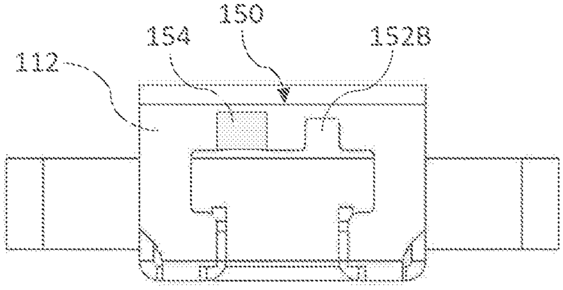
FIG. 17A-C show different keying arrangements for a key slot assembly of the printhead carrier.
Figure 17B:
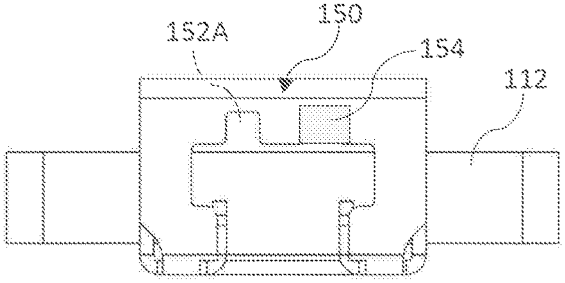
Figure 17C:
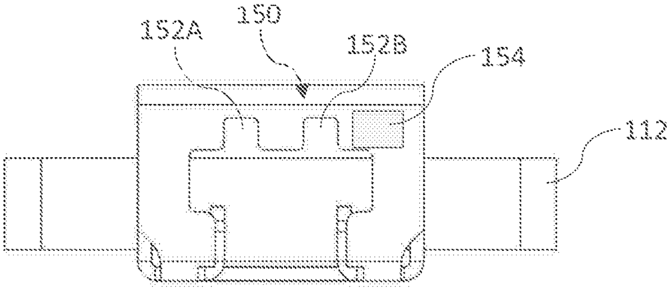

Finally, as shown in FIG. 17C, the shutter 154 has been moved across to a neutral position so that both the first and second key slots 152A and 152B are open. In this configuration, the printhead 50 may be inserted in either the first or second printhead orientation. This cradle configuration may be useful for testing purposes, but is not typically used in the field.

While the present embodiment is described above with reference to the key projection 132 on the printhead 50 and a complementary key slot assembly 150 on the printhead carrier 112, it will of course be appreciated that complementary keying engagement between the printhead and the printhead carrier may be achieved with any combination of key slot/keying projection on either component.

Switchable Data Paths

Figure 18A:
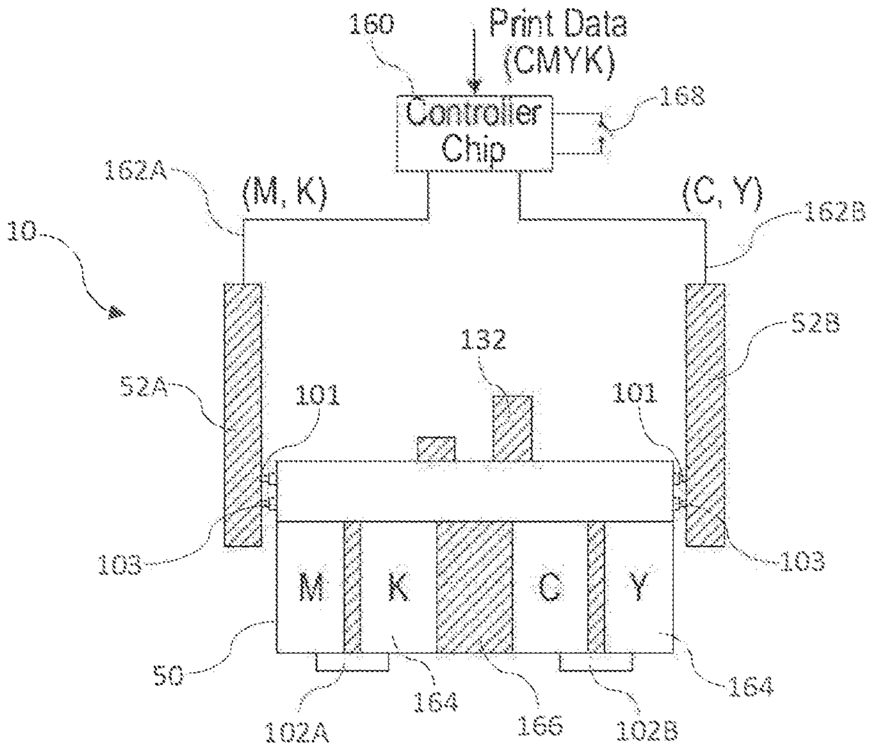
FIGS. 18A and 18B show data paths for inkjet printhead modules having printheads received in first and second printhead orientations, respectively.
Figure 18B:
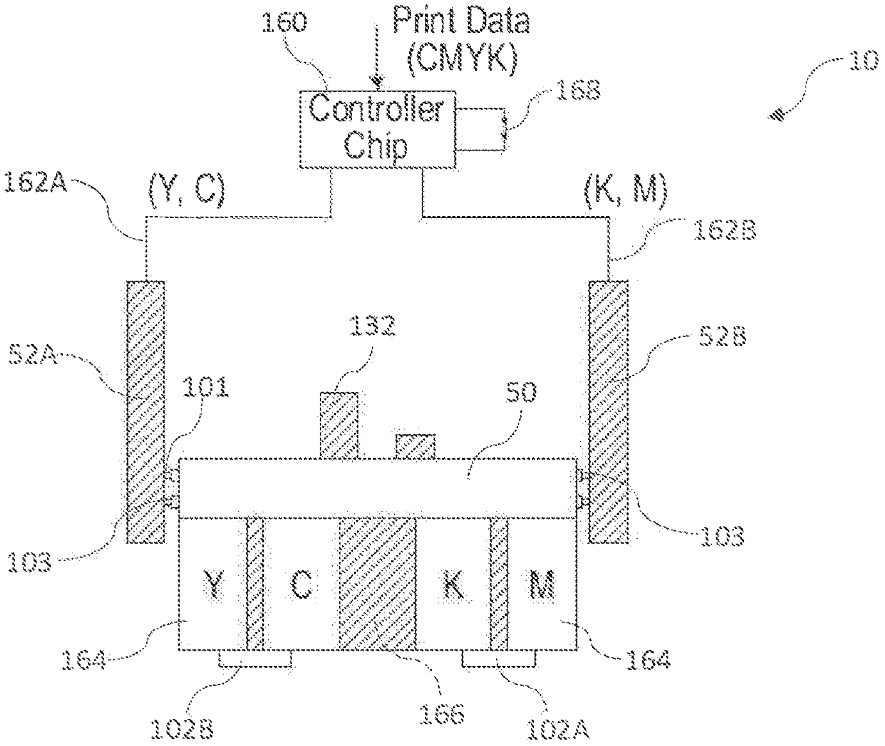

Referring to FIGS. 18A and 18B, there is shown a data path for delivering print data signals to the printhead 50 in its first orientation (FIG. 18A) and second orientation (FIG. 18B). The printhead 50 is shown schematically in section viewed from the first end of the inkjet print module 10 having the access opening 110.

An onboard controller chip 160 of the inkjet print module 10 receives print data for each of cyan, magenta, yellow and black color planes from. The print data is typically sent to the controller chip 10 from an external a raster image processor (RIP) and, in the case of a plurality of overlapping printheads 50, the respective controller chip 50 of each inkjet print module 10 receives print data for a dedicated segment of an image.

The controller chip 160 distributes the received print data via first and second data paths 162A and 162B to the printhead 50. The first and second data paths 162A and 162B comprise respective first and second PCBs 52A and 52B, which deliver data signals to printhead contacts 103 at opposite sides of the printhead 50 via respective PCB contacts 101.

As shown in FIG. 18A, the printhead 50 is inserted in its first orientation, as determined by the positioning of the key projection 132 viewed from the first end of the inkjet print module 10 having the access opening 110. By way of example only, ink channels 164 in an ink manifold 166 of the printhead 50 are nominally plumbed in the order M, K, C, Y (in the direction from first PCB 52A to second PCB 52B), such that the first row of print chips 102A prints magenta and black inks (magenta being the leading ink color) and the second row of print chips prints cyan and yellow inks (yellow being the trailing ink color).

An electrical switch 168 (e.g. toggle switch) operably connected to the controller chip 160 is nominally open with the printhead 50 in its first orientation shown in FIG. 18A. With the switch 168 open, the controller chip 160 distributes magenta and black data signals ("first data signal") to the first data path 162A, and cyan and yellow data signals ("second data signal") to the second data path 162B. Hence, the first and second rows of print chips 102A and 102B receive the correct data signals for their respective ink colors.

Turning to FIG. 18B, the printhead 50 is inserted into the inkjet print module 110 in its second orientation rotated 180 degrees relative to the first orientation, as indicated by the positioning of the key projection 132. In this second printhead orientation, the ink channels 164 of printhead 50 are typically plumbed in the reverse order of Y, C, K, M (in the direction from first PCB 52A to second PCB 52B). Hence, the first row of print chips 102A still prints magenta and black inks, while the second row of print chips 102B still prints cyan and yellow inks. In practice, changing the plumbing order of the printhead 50 is relatively easily achieved simply by reversing an order of ink reservoir connections to module ink ports 11.

Still referring to FIG. 18B, with the printhead 50 in its second orientation and a plumbing order of ink channels 164 reversed, the switch 168 is closed. Closing the switch 168 instructs the controller chip 160 to invert distribution of the first and second data signals between the first and second data paths. Accordingly, the controller chip 168 distributes magenta and black data signals ("first data signal") to the second data path 162B, and cyan and yellow data signals ("second data signal") to the first data path 162A. Hence, the first and second rows of print chips 102A and 102B still receive the correct data signals for their respective ink colors.

The advantages of configuring the inkjet print module 10 in this way first for first and second printhead orientations will be readily apparent from the description below of a modular array having forward—and reverse-facing modules.

Modular Array

Figure 19:
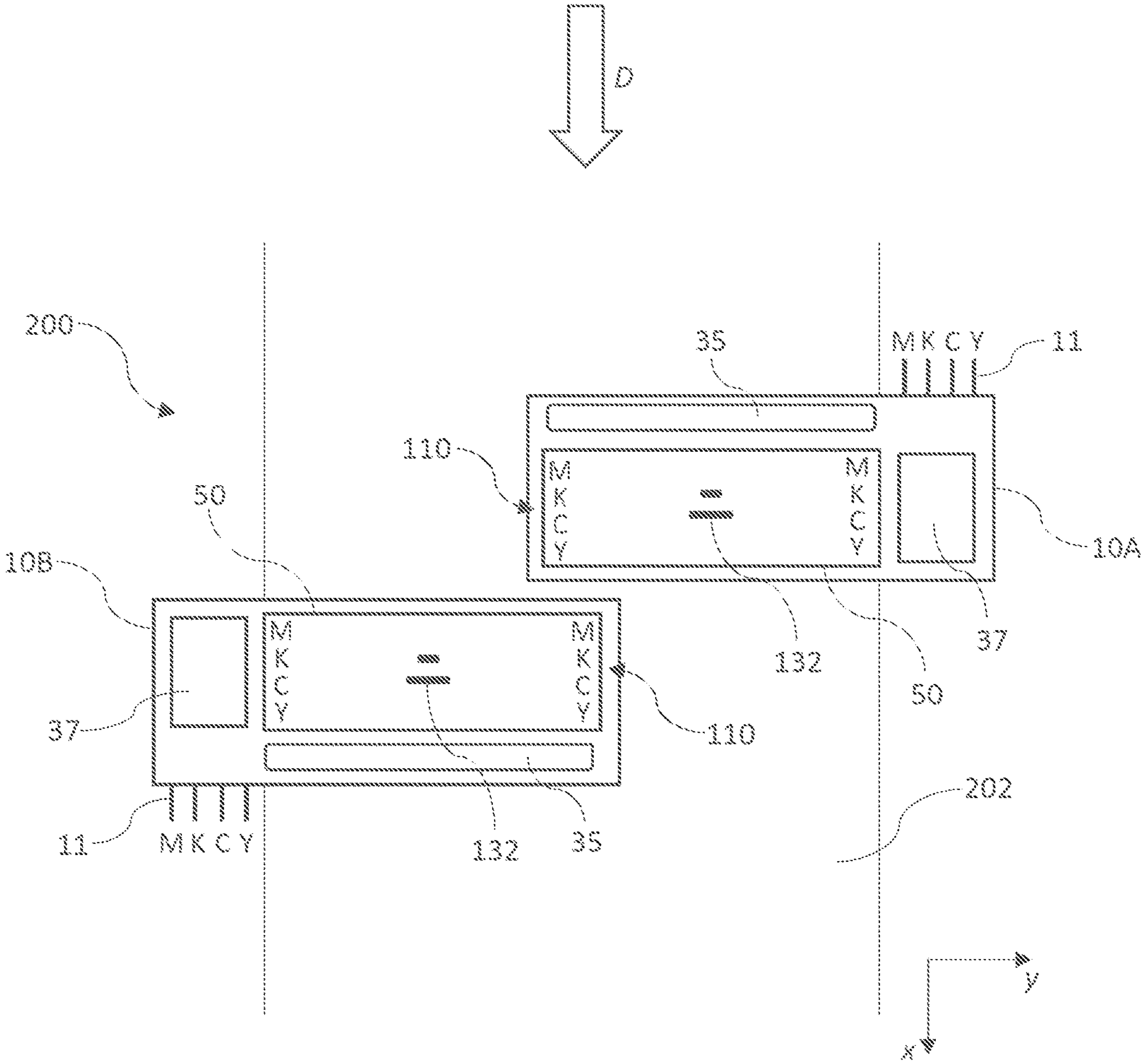
FIG. 19 is a schematic plan view of a printing system having forward and reverse-facing inkjet print modules.

FIG. 19 shows schematically a printing system 200 comprising a modular array of inkjet print modules 10 positioned in a staggered overlapping arrangement across a media feed path 202. In this example, the printing system 200 comprises a pair of inkjet print modules with a second inkjet module 10B trailing a first inkjet module 10A relative to a media feed direction designated by arrow D. However, it will of course be appreciated that any number of inkjet modules 10 may be a positioned across the media path 202 for printing on different media widths. For example, the printing system 200 may have two leading inkjet print modules and one trailing inkjet print module in a 3-wide array. Other modular arrangements will be readily apparent to the person skilled in the art.

As shown in FIG. 19, the trailing second inkjet print module 10B is rotated by 180 degrees relative to the first inkjet print module 10A. Since the printhead 50 is asymmetrically positioned towards one side of its respective inkjet print module 10, this arrangement positions the printheads 50 of the leading and trailing inkjet print modules 10A and 10B as closely to together as possible along the media feed direction D. Proximal placement of the printheads 50 in this way advantageously minimizes alignment errors, resulting in improved print quality, particularly in the overlap region of the modules.

As a consequence of the second inkjet print module 10B being rotated by 180 degrees relative to the first inkjet print module 10A, it will be appreciated that the cappers 35 of respective first and second inkjet print modules necessarily move towards each in opposite directions parallel with the media feed direction D in order to cap respective printheads 50. Similarly, the wiper carriages 37 of respective first and second inkjet print modules necessarily move towards each other in a direction perpendicular to the media feed direction D in order to wipe respective printheads 50.

As described above, the module ink ports 11 of the first and second inkjet print modules 10A and 10B are connected to respective ink reservoirs (not shown) in such as way so as to maintain a same order of ink colors with respect to the media feed direction D (nominally in the order M, K, C, Y in the printing system 200 shown in FIG. 19). Accordingly, the module ink ports 11 of the second inkjet print module 10B are connected in reverse order compared to the module ink ports of the first inkjet print module 10A.

While reversal of ink plumbing in the second inkjet print module 10B maintains the order of ink colors with respect to the media feed direction D, insertion of the printhead 50 into the second inkjet module 10B in its second printhead orientation (as shown FIG. 19 and described above in connection with FIG. 18B) allows all printheads in the printing system 200 to be used interchangeably. Thus, the printhead 50 in its first printhead orientation in the first inkjet print module 10A may be removed and inserted into the second inkjet print module 10B in its second printhead orientation without mixing ink colors and, moreover, without any reconfiguring of the printing system 200.

Furthermore, each inkjet print module 10 manufactured at the factory is readily modifiable for use in either a forward—or reverse-facing orientation simply by moving the shutter 154 and configuring the switch 168 appropriately. Essentially, each inkjet print module 10 is agnostic with respect its orientation of use, providing significant advantages over printing systems that require dedicated forward—and reverse-facing modules having different mechanical designs.

It will, of course, be appreciated that the present invention has been described by way of example only and that modifications of detail may be made within the scope of the invention, which is defined in the accompanying claims.

The invention claimed is:

1. An inkjet print module comprising:

a printhead comprising first and second rows of print chips, said printhead having 180 degree rotational symmetry about a print axis parallel to a direction of droplet ejection;

a fixed printhead keying feature extending from the printhead, said printhead keying feature being rotationally asymmetric about the print axis notwithstanding the rotational symmetry of the printhead;

a cradle for removably receiving the printhead, said cradle comprising a key assembly for complementary engagement with the fixed printhead keying feature, the key assembly being selectively configurable in either one of first and second cradle configurations, wherein:

the cradle receives the printhead only in a first printhead orientation in the first cradle configuration; and the cradle receives the printhead only in a second printhead orientation in the second cradle configuration, the second printhead orientation being rotated 180 degrees about the print axis relative to the first printhead orientation.

2. The inkjet print module of claim 1, wherein the key assembly has a pair of slots defined in part of the cradle and a shutter for selectively obscuring either one of the slots.

3. The inkjet print module of claim 2, wherein the shutter is slidably movable between the pair of slots.

4. The inkjet print module of claim 3, wherein the key assembly is positioned at a first end of the printhead carrier, the printhead carrier receiving the printhead at said first end.

5. The inkjet print module of claim 4, wherein the printhead carrier pivotable about a second end opposite the first end thereof.

6. The inkjet print module of claim 1, wherein the cradle comprises a printhead carrier for longitudinally slidably receiving the printhead, the printhead carrier including the key assembly.

7. The inkjet print module of claim 1, wherein the printhead comprises a plurality of printhead ink ports at opposites ends thereof and the inkjet print module comprises complementary ink couplings for detachable connection to the printhead ink ports.

8. The inkjet print module of claim 7, further comprising a plurality of module ink ports for connection to a corresponding plurality of ink reservoirs supplying ink to the ink couplings, each module ink port being connectable to any one of the plurality of ink reservoirs such that an order of inks supplied to the printhead ink ports is reversible.

9. The inkjet print module of claim 1, further comprising control circuitry for distributing data signals to the printhead via first and second data paths, wherein a switch is operatively connected to the control circuitry for inverting distribution of the data signals based on an orientation of the printhead.

* * * * *